United States Patent (10) Patent No.: US 11,319,837 B2
Leque et al. (45) Date of Patent: May 3, 2022

(54) LUBRICATION SYSTEMS AND METHODS WITH SUPERPOSITION GEARBOX

(71) Applicant: UNITED TECHNOLOGIES CORPORATION, Farmington, CT (US)

(72) Inventors: Nicholas D. Leque, Vernon, CT (US); Joseph H. Polly, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 58 days.

(21) Appl. No.: 17/035,872

(22) Filed: Sep. 29, 2020

(65) Prior Publication Data

US 2021/0207496 A1 Jul. 8, 2021

Related U.S. Application Data

(62) Division of application No. 16/353,094, filed on Mar. 14, 2019, now Pat. No. 10,823,006.

(51) Int. Cl.
*F01D 25/20* (2006.01)
*F01M 1/02* (2006.01)
(Continued)

(52) U.S. Cl.
CPC ............. *F01D 25/20* (2013.01); *F01D 15/08* (2013.01); *F01D 15/12* (2013.01); *F01M 1/02* (2013.01);
(Continued)

(58) Field of Classification Search
CPC .......... F01D 15/08; F01D 15/12; F01D 25/20; F02C 7/32; F02C 7/36; F05D 2260/40311; F05D 2260/226; F05D 2260/98
See application file for complete search history.

(56) References Cited

U.S. PATENT DOCUMENTS 7,168,913 B2 1/2007 Lardellier
7,481,062 B2 * 1/2009 Gaines ...................... F02K 3/06
60/792

(Continued)

FOREIGN PATENT DOCUMENTS

EP 2322766 A2 5/2011
EP 3636898 A1 4/2020
WO 2015126500 A1 8/2015

OTHER PUBLICATIONS

European Search Report for European Application No. 20161596.0 dated Jul. 17, 2020.

*Primary Examiner* — Ninh H. Nguyen
(74) *Attorney, Agent, or Firm* — Carlson, Gaskey & Olds, P.C.

(57) ABSTRACT

An engine includes a spool including a turbine, a second spool including a second turbine, a fan, and a fan drive gear system. A tower shaft is engaged to the spool. A second tower shaft is engaged to the second spool. A superposition gear system includes a plurality of intermediate gears engaged to the sun gear and supported in a carrier and a ring gear circumscribing the intermediate gears. The tower shaft drives the sun gear. An oil pump is driven by the carrier and supplies oil to the fan drive gear system from an oil tank through a first pickup at a first end of the oil tank and a second pickup at a second, opposite end of the oil tank. A shuttle valve at a suction side of the oil pump selectively allows oil to be supplied by one of the first and second pickup.

20 Claims, 3 Drawing Sheets

(51) Int. Cl.
*F01M 11/06* (2006.01)
*F02C 7/32* (2006.01)
*F02C 7/36* (2006.01)
*F02K 3/06* (2006.01)
*F16H 1/28* (2006.01)
*F16H 57/04* (2010.01)
*F01D 15/08* (2006.01)
*F01D 15/12* (2006.01)

(52) U.S. Cl.
CPC ............ *F01M 11/064* (2013.01); *F02C 7/32* (2013.01); *F02C 7/36* (2013.01); *F02K 3/06* (2013.01); *F16H 1/28* (2013.01); *F16H 57/045* (2013.01); *F16H 57/0436* (2013.01); *F16H 57/0486* (2013.01); *F01M 2001/0253* (2013.01); *F05D 2220/323* (2013.01); *F05D 2260/40311* (2013.01); *F05D 2260/98* (2013.01)

(56) References Cited

U.S. PATENT DOCUMENTS

| | | | |
|---|---|---|---|
| 7,997,085 | B2 | 8/2011 | Moniz et al. |
| 8,230,974 | B2 | 7/2012 | Parnin |
| 9,410,448 | B2 | 8/2016 | Sheridan et al. |
| 9,657,646 | B2 * | 5/2017 | Wotzak ............... F01D 25/28 |
| 9,739,173 | B2 | 8/2017 | Valva et al. |
| 10,041,489 | B2 | 8/2018 | Parnin |
| 10,107,157 | B2 | 10/2018 | Roberge |
| 2009/0205341 | A1 | 8/2009 | Muldoon |
| 2010/0294597 | A1 | 11/2010 | Parnin |
| 2013/0098059 | A1 | 4/2013 | Suciu et al. |
| 2013/0247539 | A1 | 9/2013 | Hoppe |
| 2016/0376988 | A1 | 12/2016 | Sheridan |
| 2017/0122330 | A1 | 5/2017 | Mastro et al. |
| 2017/0190441 | A1 * | 7/2017 | Mackin ............... F01D 25/36 |
| 2018/0073384 | A1 * | 3/2018 | Bordoni ............ F16D 25/0635 |
| 2020/0291817 | A1 | 9/2020 | Leque et al. |

* cited by examiner

LUBRICATION SYSTEMS AND METHODS WITH SUPERPOSITION GEARBOX

CROSS-REFERENCE TO RELATED APPLICATION

This application is a divisional U.S. application Ser. No. 16/353,094, which was filed on Mar. 14, 2019.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Increasing amounts of power for aircraft accessory items are extracted from the turbine engine. Engine architectures include a single tower shaft coupled to a high speed spool of the engine. The tower shaft is used to start the engine and also to extract power during engine operation. Increasing loads on the single spool of the engine can limit potential engine performance capabilities.

SUMMARY

A turbofan engine according to an example of this disclosure, includes a first spool including a first turbine, a second spool including a second turbine, a fan, and a fan drive gear system drives the fan at a lower speed than the second spool. A first tower shaft is engaged to the first spool. A second tower shaft is engaged to the second spool. A superposition gear system includes a plurality of intermediate gears engaged to the sun gear and supported in a carrier and a ring gear circumscribing the intermediate gears. The first tower shaft is engaged to drive the sun gear. The engine includes an oil tank. An oil pump is driven by the carrier and supplies oil to the fan drive gear system from the oil tank through a first pickup at a first end of the oil tank and a second pickup at a second end of the oil tank opposite the first end. A shuttle valve at a suction side of the oil pump selectively allows oil to be supplied to the fan drive gear system by one of the first pickup and the second pickup.

In a further example of the foregoing, the shuttle valve is a gravity actuated valve.

In a further example of any of the foregoing, the oil pump supplies oil during both normal and negative G conditions.

In a further example of any of the foregoing, the turbofan engine includes a bearing compartment housing the fan drive gear system. A scavenge pump pumps scavenge oil from the bearing compartment to the oil tank.

In a further example of any of the foregoing, a gutter is provided within the bearing compartment to catch deflected oil from the fan drive gear system and direct it toward the bottom of the bearing compartment.

In a further example of any of the foregoing, the turbofan engine includes a first line, which extends from the oil pump, and a second line which extends from the first line and is for supplying oil to the fan drive gear system from the oil tank. A third line extends from the first line and is for supplying oil to a turbofan engine component from the oil tank.

In a further example of any of the foregoing, the first line is disposed at a pressure side of the oil pump.

In a further example of any of the foregoing, the first end of the oil tank is an upper end of the oil tank, and the second end of the oil tank is a lower end of the oil tank.

In a further example of any of the foregoing, the shuttle valve is a gravity actuated valve.

In a further example of any of the foregoing, the second turbine is disposed axially forward of the first turbine.

In a further example of any of the foregoing, the ring gear shaft is coupled to the ring gear through a clutch.

In a further example of any of the foregoing, the ring gear shaft is driven by the second spool through the second tower shaft.

In a further example of any of the foregoing, the first tower shaft and the second tower shaft are concentric.

In a further example of any of the foregoing, the carrier is driven by each of the first spool and the second spool.

In a further example of any of the foregoing, the first turbine comprises a low pressure turbine and the second turbine comprises a high pressure turbine.

In a further example of any of the foregoing, the carrier is coupled to drive a first gear system within an accessory gearbox for driving a first group of a plurality of accessory components including the oil pump.

In a further example of any of the foregoing, the turbofan engine includes a first line, which extends from the oil pump. A second line extends from the first line and for supplying oil to the fan drive gear system from the oil tank. A third line extends from the first line and supplies oil to a turbofan engine component from the oil tank.

In a further example of any of the foregoing, the first line is disposed at a pressure side of the oil pump.

In a further example of any of the foregoing, a bearing compartment houses the fan drive gear system. A scavenge pump pumps scavenge oil from the bearing compartment to the oil tank.

In a further example of any of the foregoing, the first tower shaft and the second tower shaft are disposed about different axes.

These and other features may be best understood from the following specification and drawings, the following of which is a brief description.

DETAILED DESCRIPTION

Figure 1:
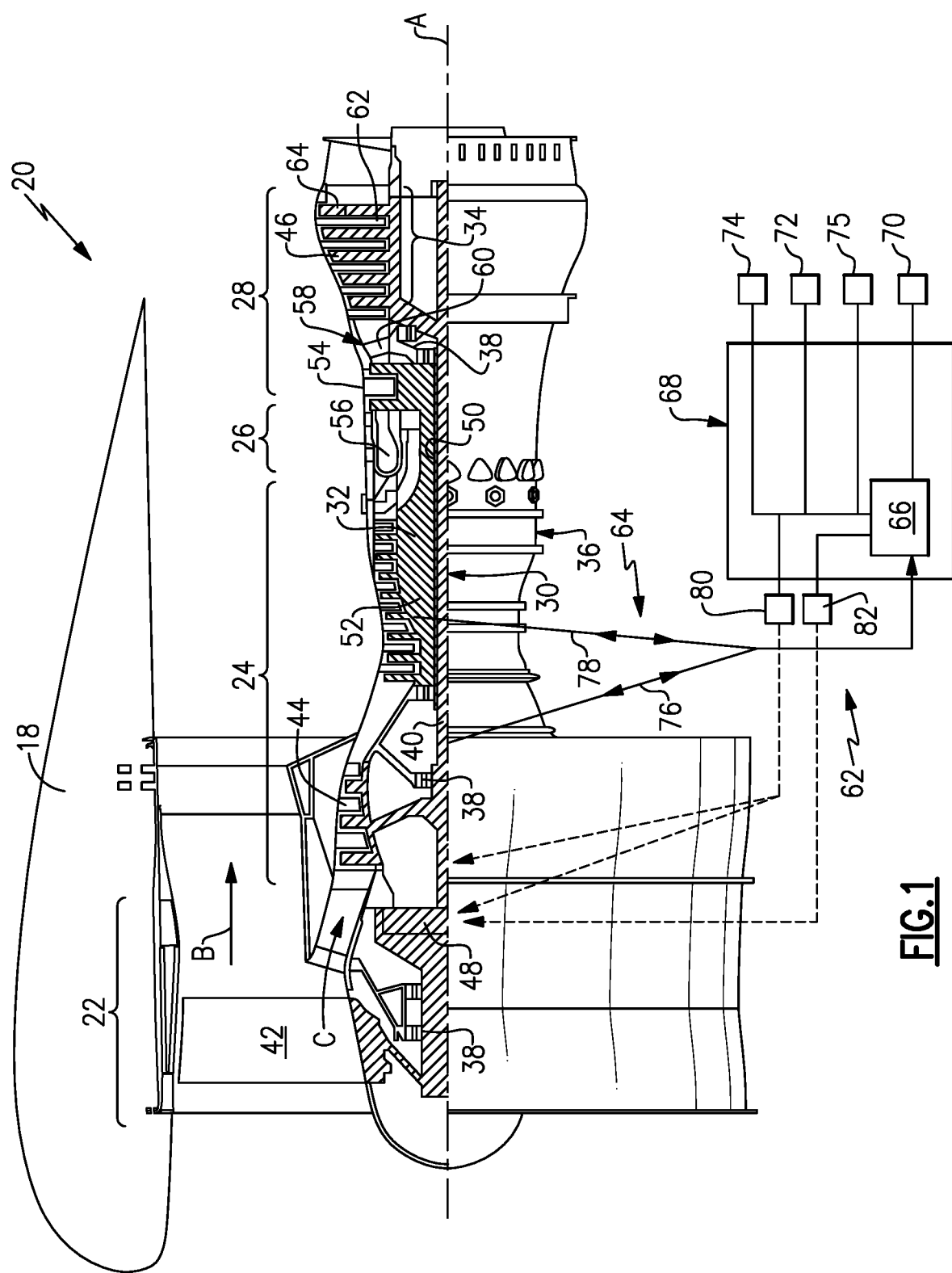
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to a fan section 22 through a speed change mechanism, which in exemplary gas turbine engine 20 is illustrated as a geared architecture 48 to drive fan blades 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor 44 and the fan blades 42 may be positioned forward or aft of the location of the geared architecture 48 or even aft of turbine section 28.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\,°\,R)/(518.7°\,R)]^{0.5}$. The "Low corrected fan tip speed" as disclosed herein according to one non-limiting embodiment is less than about 1150 ft/second (350.5 meters/second).

The example gas turbine engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Excessive power extraction from a single spool, such as the high speed spool 32, can limit operation and degrade overall performance and engine efficiency. Accordingly, the example accessory drive system 62 extracts power from both the low speed spool 30 and the high speed spool 32 to meet the overall power demands of the engine 20 and the aircraft associated with the engine. The power extracted from the spools 30, 32 is combined in a superposition gear system 66 disposed within the accessory gearbox 68. The drive system 62 drives various accessory components, including, in some examples, as shown, a de-oiler (DO) 72, a hydraulic pump (HP) 74, a variable frequency generator (VFG) 75, a main oil pump (MOP) 80, and an auxiliary oil pump (AOP) 82. Additional or alternative accessory components may be utilized in the examples of this disclosure.

In the example, the main oil pump 80 supplies oil, such as lubricant, to various components of the gas turbine engine 20, including the fan drive gear system 48, also referred to as a geared architecture, as shown schematically. The auxiliary oil pump 82 is an auxiliary pump for supplying oil to the fan drive gear system 48. It is important to maintain a supply of oil to the fan drive gear system 48 any time the fan 42 is rotating, including when there is a lack of pressure in the main oil pump 80, such as when the engine is windmilling (engine is not running from its own power either in flight or on the ground but is still rotating) or during a negative G maneuver of the aircraft, as explained further below. The auxiliary oil pump 82 provides oil to the fan drive gear system 48 during such conditions.

Figure 2:
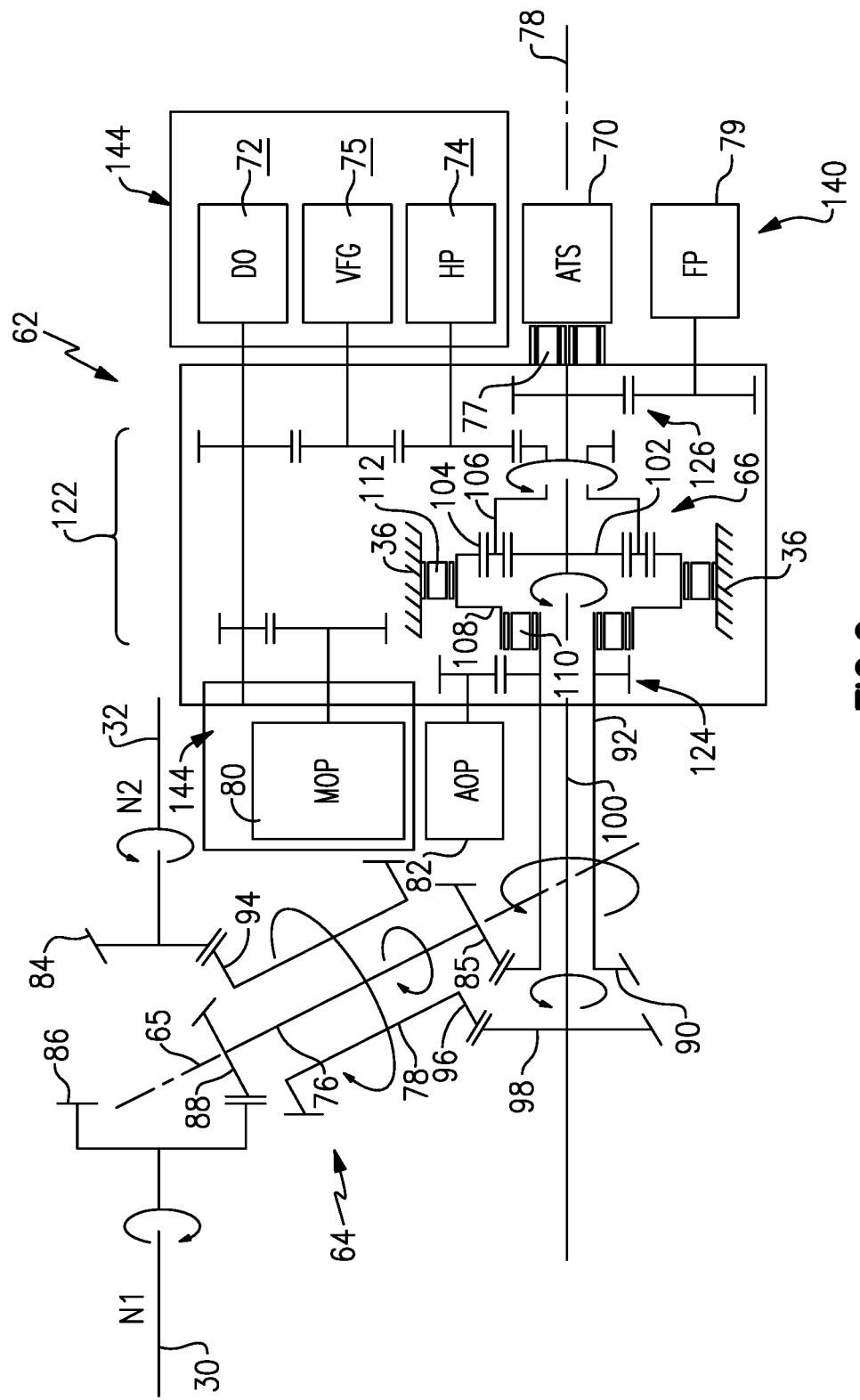
FIG. 2 schematically illustrates an example dual spool power extraction gearbox.

Referring to FIG. 2, with continued reference to FIG. 1, the superposition gear system 66 is an epicyclic gearbox that includes a sun gear 102 that rotates about an axis 78. A plurality of intermediate gears 104 are engaged with the sun gear 102 and supported by a carrier 106. A ring gear 108 circumscribes and engages the plurality of intermediate gears 104.

In the disclosed example, the tower shaft assembly 64 includes the first tower shaft 76 that is driven by a gear 86 disposed on the low speed spool 30. A first gear 88 on the tower shaft 76 is coupled to the gear 86. A second gear 85 is disposed on a second end of the tower shaft 76 and engages a drive gear 90 disposed on a ring gear shaft 92.

A second tower shaft 78 is coupled to a drive gear 84 that is driven by the high speed spool 32. The second tower shaft 78 includes a first gear 94 driven by the gear 84 on the high speed spool 32. A second gear 96 of the second tower shaft 78 is engaged to drive gear 98 disposed on a sun gear shaft 100.

In this example, the first tower shaft 76 and the second tower shaft 78 are disposed concentrically about a common axis 65. Moreover, the axis 65 is disposed at an angle relative to the engine longitudinal axis A and an axis 78 of the superposition gear system 66. It should be appreciated that although the specific disclosed embodiment includes concentric tower shafts 76, 78, other configurations and orientations of tower shafts are within the contemplation and scope of this disclosure.

The first tower shaft 76 is coupled to the ring gear shaft 92 that is selectively coupled to the ring gear 108 through a first ring gear clutch 110. The second tower shaft 78 is coupled to the sun gear shaft 100 that is coupled to drive the sun gear 102. The example sun gear shaft 100 directly couples to the sun gear 102 and extends past the sun gear 102 to the starter (ATS) 70.

The superposition gear system 66, therefore, has a first input provided by the first tower shaft 76 through the ring gear shaft 92 to drive the ring gear 108 and a second input provided by the second tower shaft 78 to drive the sun gear shaft 100 and, thereby, the sun gear 102.

A first output from the superposition gear system 66 is provided by the carrier 106. The carrier 106 forms a common shaft that drives an accessory group 144 in the disclosed example embodiment. The output provided by the carrier 106 is a combination of the inputs from the ring gear shaft 92 and the sun gear shaft 100. The accessory group 144 is therefore driven by one or both of the ring gear shaft 92 and the sun gear shaft 100, such that it is driven when one or both of the low speed spool 30 and high speed spool 32 are rotating. The ring gear shaft 92 provides a second output to drive the accessory group 142. Another accessory group 140 is driven by the sun gear shaft 100.

The sun gear shaft 100 provides both another input into the gear system 66 by being driven by the starter 70 and the third output to drive the accessory group 140. In this example embodiment, the accessory group 140 includes the fuel pump (FP) 79. However, other components could be driven from the sun gear shaft 100. The starter 70 provides a driving input to the sun gear 102 through the sun gear shaft 100. The fuel pump 79 may be driven by a gear 126 coupled to the sun gear shaft 100. The gear 126 is operable to rotate at the speed of the sun gear shaft 100 during engine operation and when driven by the starter 70 during starting operations.

The example superposition gear system 66 includes a direct connection between the starter 70 and the sun gear shaft 100 to provide for direct driving of the high speed spool 32. The sun gear shaft 100 is coupled to the starter 70 through a starter clutch 77. The starter clutch 77 in this example is a mechanical one-way clutch that enables direct driving of the high speed spool 32 during starting operations. Once the high speed spool 32 is operating, the starter clutch 77 prevents back driving or over driving of the starter 70. The sun gear shaft 100 is directly connected to the starter rather than being driven through a gear system. The direct drive of the high speed spool 32 through the direct connection simplifies operation and the mechanical connections.

The example superposition gear system 66 provides the first output through the carrier 106 that drives the accessory group 144 through a first gear system 122. In this example the accessory group 144 includes the de-oiler 72, hydraulic pump 74, variable frequency generator 75, and the main oil pump 80, which are driven at a first speed. Once the engine is started, the first output through the carrier 106 provides the driving input required to power the accessory components de-oiler 72, variable frequency generator 75 and the main oil pump 80 through the first gear system 122.

The auxiliary oil pump 82 is driven by the ring gear shaft 92 through a second gear system 124. Although only the auxiliary oil pump 82 is shown as being driven by the second gear system 124 in the illustrative example, additional components could be included driven by the second gear system 124 in other examples.

The main oil pump 80 may therefore by driven through the carrier 106 by one or both of the low speed spool 30 and high speed spool 32, while the auxiliary oil pump 82 is driven through the ring gear shaft 92 by the low speed spool 30. In some examples, the main oil pump 80 and auxiliary oil pump 82 may be attached to the outside of the gearbox 68 and may connect to the gearbox by a pass-through shaft.

The superposition gear system 66 includes the first ring gear clutch 110 that couples the ring gear shaft 92 to the ring gear 108. A second ring gear clutch 112 couples the ring gear 108 to a static engine structure 36. In this example, both the first ring gear clutch 110 and the second ring gear clutch 112 are mechanical one-way clutches. Moreover, in this example, the first and second mechanical one-way clutches 110, 112 are sprag clutches. It should be appreciated that although sprag clutches are disclosed by way of example, other mechanical clutch systems could be utilized and are within the contemplation of this disclosure.

The second ring gear clutch 112 couples the ring gear 108 to the engine static structure 36 during a starting operation to prevent rotation of the ring gear 108 and thereby the first tower shaft 76 and the low speed spool 30. When the ring gear 108 is fixed, the starter 70 will drive the sun gear shaft 100 such that it will be the only driving output back to the high speed spool 32.

During a windmill condition, in which the fan 20 (see FIG. 1) and therefore low speed spool 30 are rotating, the main oil pump 80 is driven through the carrier 106, and the auxiliary oil pump 82 is driven through the ring gear shaft 92. In a reverse windmill condition, however, the clutch 110 disengages the ring gear shaft 92 from the ring gear 108, such that the carrier 106 and therefore main oil pump 80 are not driven by the reverse windmill rotation of the low speed spool 30. The auxiliary oil pump 82 is still driven during the reverse windmill condition, however, by the ring gear shaft 92 through the second gear system 124. That is, the second gear system 124 is not disengaged from the shaft 92 by the clutch 110. In some examples, as shown, the second gear system 124 is forward of the clutch 110. The auxiliary oil pump 82 therefore supplies oil to the fan drive gear system 48 (FIG. 1) when the engine 20 is in a reverse windmill condition.

Figure 3:
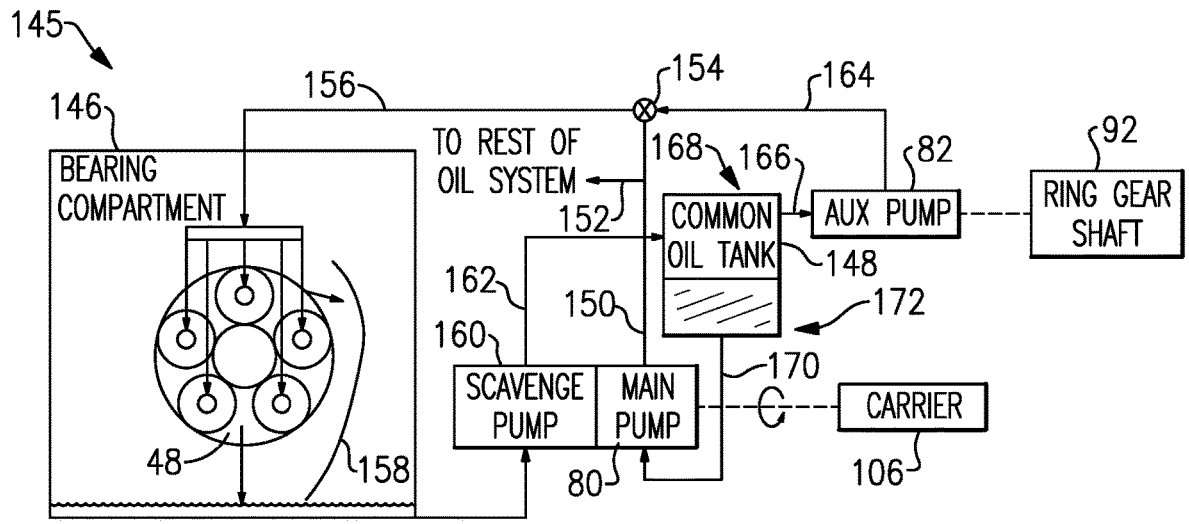
FIG. 3 schematically illustrates an example oil supply system.

FIG. 3 schematically illustrates an example oil supply system 145 that may be utilized with the example gas turbine engine 20 of FIG. 1 and driven by the example drive system 62 of FIG. 2. The main oil pump 80 and the auxiliary oil pump 82 are configured to supply oil to the fan drive gear system 48 located within a bearing compartment 146. The main oil pump 80 and the auxiliary oil pump 82 source oil from a common oil tank 148. By locating both the main oil pump 80 and auxiliary oil pump 82 at the superposition gear system 66 (see FIG. 2), the main oil pump 80 and the auxiliary oil pump 82 are in close enough proximity to share the common oil tank 148, eliminating the need for a second auxiliary tank in some examples.

The main oil pump 80 is driven by the carrier 106 and supplies oil from the common oil tank 148 through a line 150 which includes one or more branches 152 that supplies oil to the rest of the oil system, which may include bearing systems 38 and other locations within the engine that use oil (FIG. 1). Downstream of the one or more branches 152 is a shuttle valve 154. The shuttle valve 154 is therefore located at the pressure side of the main oil pump 80. Downstream of the shuttle valve 154 is a line 156 which supplies oil to the bearing compartment 146. A gutter 158 may be provided within the bearing compartment 146 to catch deflected oil from the fan drive gear system 48 and direct it toward the bottom of the bearing compartment 146. A scavenge pump 160 may pump scavenge oil from the bottom of the bearing compartment 146 through a line 162 back to the common oil tank 148.

The auxiliary oil pump 82 is driven by the ring gear shaft 92 and pumps oil from the common oil tank 148 through a line 164 to the shuttle valve 154. The shuttle valve 154 is therefore located on the pressure side of the auxiliary oil pump 82. Oil pumped from the auxiliary oil pump 82 to the shuttle valve 154 continues through the line 156 to the bearing compartment 146. The line arrangements illustrated are exemplary, and one of ordinary skill in the art having the benefit of this disclosure would recognize that other line arrangements may be utilized.

While the main oil pump 80 is configured to supply oil to both the fan drive gear system 48 and the rest of the oil system, the example auxiliary oil pump 82 is only configured to supply oil to the fan drive gear system 48. In other examples, the auxiliary oil pump 82 may supply oil to other components.

The shuttle valve 154 selectively chooses which of the main oil pump 80 and the auxiliary oil pump 82 pumps oil to the fan drive gear system 48. In some examples, if the main oil pump 80 is providing a greater oil pressure than the auxiliary oil pump 82, the shuttle valve 154 selects the main oil pump 80 to supply the oil to the fan drive gear system 48. If the auxiliary oil pump 82 has a higher oil pressure than the main oil pump 80, the shuttle valve 154 will select the auxiliary oil pump 82 to supply oil to the fan drive gear system 48.

In some examples, the shuttle valve 154 is a mechanical valve that utilizes spring pressure to cut off oil supply from either the main oil pump 80 or auxiliary oil pump 82, depending on which is at a lower pressure. This allows for supply of oil from only one source, with the other source inactive, which allows for a more efficient lubrication system. In some examples, the shuttle valve 154 may be an actuated valve that responds to sensors (not shown) reading pressures associated with the main oil pump 80 and the auxiliary oil pump 82 in order to determine which of the main oil pump 80 and the auxiliary oil pump 82 to select for feeding oil to the fan drive gear system 48.

An example auxiliary pick up 166 between the common oil tank 148 and the auxiliary oil pump 82 is located at an upper end 168 of the common oil tank 148. A main pickup 170 between the common oil tank 148 and the main oil pump 80 is located at a lower end 172 of the common oil tank 148 opposite the upper end 168. During a negative G maneuver, oil is forced to the upper end of the common oil tank 148, where the auxiliary pickup 166 is located. Therefore, during the negative G maneuver, the auxiliary oil pump 82 pumps oil to the shuttle valve 154 and through the line 156 to the fan drive gear system 48. The example auxiliary oil pump 82 therefore supplies oil to the fan drive gear system 48 during reverse windmill and negative G conditions, when the main oil pump 80 cannot supply oil.

A method that may be utilized with the examples of FIGS. 1-3 is also disclosed. The method includes coupling a first tower shaft 78 to engage a first spool 32 and coupling a second tower shaft 76 to engage a second spool 30. The method further includes coupling a sun gear 102 of a superposition gear system 66 supported within the accessory gearbox 68 to the first tower shaft 78, wherein the superposition gear system includes the sun gear 102, a plurality of intermediate gears 104 engaged to the sun gear 102 and supported in a carrier 106 and a ring gear 108 circumscribing the intermediate gears 104. The method further includes coupling a main oil pump 80 to the carrier 106. The method further includes coupling an auxiliary oil pump 82 to a ring gear shaft 92 driven by the second spool 30. The method further includes selecting at least one of the main oil pump 80 and the auxiliary oil pump 82 to supply oil to a fan drive gear system 48 of the turbofan engine 20.

In prior art systems, the auxiliary oil pump and a separate auxiliary oil tank were located at the forward end of the engine and powered by the low speed spool 30. This required a separate auxiliary tank and associated drive train driven by the fan rotor. In the configurations shown in FIGS. 2 and 3, the auxiliary oil pump 82 is located at the superposition gear system 66, which eliminates the need for a separate auxiliary oil tank and the associated drive train off of the low speed spool 30, therefore reducing weight, complexity, and part count, while still providing oil to the fan drive gear system 48 during normal, forward windmill, reverse windmill, and negative G conditions.

Figure 4:
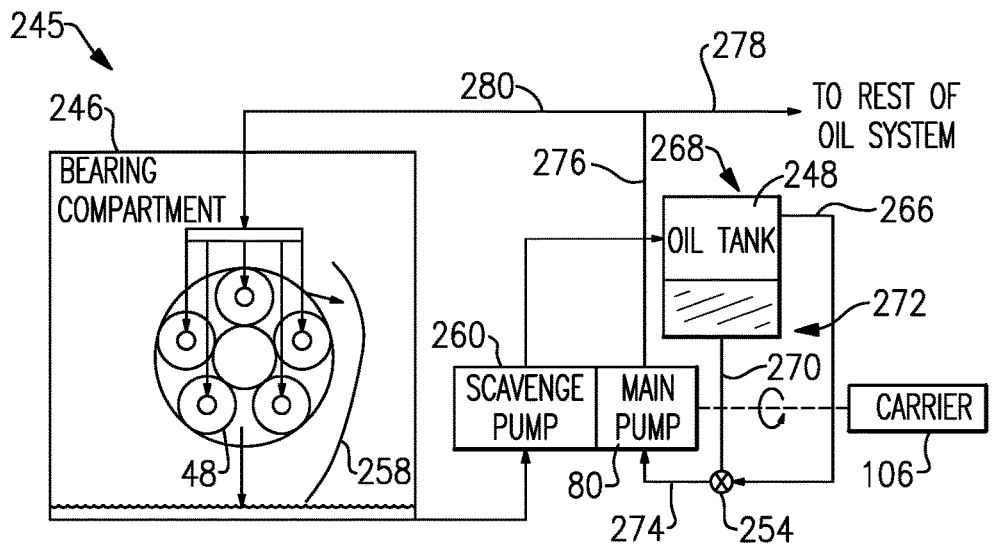
FIG. 4 schematically illustrates a second example oil supply system.

FIG. 4 illustrates a second example oil supply system 245 that may be utilized with the example accessory drive system 62 of FIG. 2 if an auxiliary oil pump 82 is not provided. An upper pickup 266 is provided at the upper end 268 of the oil tank 248 which provides oil from the oil tank 248 to the shuttle valve 254. A lower pickup 270 is provided at the lower end 272 of the oil tank 248 to provide oil from the oil tank 248 to the shuttle valve 254. In some examples, as shown, the shuttle valve 254 is located on the suction side of the main pump 80 and may be a gravity-actuated valve. Downstream of the shuttle valve 254 is a line 274 that feeds oil through the main oil pump to a line 276. Oil may then be fed to one or more lines 278 to the rest of the oil system or to line 280 to the bearing compartment 246 housing the fan drive gear system 48. The shuttle valve 254 selectively chooses which of the pickups 266, 270 supplies oil to the fan drive gear system 48. In this configuration, the main oil pump 80 may supply oil during both normal and negative G conditions.

Although the different examples are illustrated as having specific components, the examples of this disclosure are not limited to those particular combinations. It is possible to use some of the components or features from any of the examples in combination with features or components from any of the other examples.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A turbofan engine comprising:
a first spool including a first turbine;
a second spool including a second turbine;
a fan;
a fan drive gear system configured to drive the fan at a lower speed than the second spool;
a first tower shaft engaged to the first spool;
a second tower shaft engaged to the second spool;
a superposition gear system, the superposition gear system including, a plurality of intermediate gears engaged to a sun gear and supported in a carrier and a ring gear circumscribing the intermediate gears, wherein the first tower shaft is engaged to drive the sun gear;
an oil tank;
an oil pump driven by the carrier and configured to supply oil to the fan drive gear system from the oil tank through a first pickup at a first end of the oil tank and a second pickup at a second end of the oil tank opposite the first end; and
a shuttle valve at a suction side of the oil pump and configured to selectively allow oil to be supplied to the fan drive gear system by one of the first pickup and the second pickup.

2. The engine as recited in claim 1, wherein the shuttle valve is a gravity actuated valve.

3. The engine as recited in claim 1, wherein the oil pump is configured to supply oil during both normal and negative G conditions.

4. The engine as recited in claim 1, comprising:
a bearing compartment housing the fan drive gear system; and
a scavenge pump configured to pump scavenge oil from the bearing compartment to the oil tank.

5. The engine as recited in claim 4, comprising:
a gutter provided within the bearing compartment to catch deflected oil from the fan drive gear system and direct it toward the bottom of the bearing compartment.

6. The engine as recited in claim 1, comprising:
a first line extending from the oil pump;
a second line extending from the first line and for supplying oil to the fan drive gear system from the oil tank; and
a third line extending from the first line and for supplying oil to a turbofan engine component from the oil tank.

7. The engine as recited in claim 6, wherein the first line is disposed at a pressure side of the oil pump.

8. The engine as recited in claim 1, wherein the first end of the oil tank is an upper end of the oil tank, and the second end of the oil tank is a lower end of the oil tank.

9. The engine as recited in claim 8, wherein the shuttle valve is a gravity actuated valve.

10. The engine as recited in claim 1, wherein the second turbine is disposed axially forward of the first turbine.

11. The engine as recited in claim 1, wherein the ring gear shaft is coupled to the ring gear through a clutch.

12. The engine as recited in claim 1, wherein the ring gear shaft is driven by the second spool through the second tower shaft.

13. The engine as recited in claim 1, wherein the first tower shaft and the second tower shaft are concentric.

14. The engine as recited in claim 1, wherein the carrier is configured to be driven by each of the first spool and the second spool.

15. The engine as recited in claim 1, wherein the first turbine comprises a low pressure turbine and the second turbine comprises a high pressure turbine.

16. The engine as recited in claim 1, wherein the carrier is coupled to drive a first gear system within an accessory gearbox for driving a first group of a plurality of accessory components including the oil pump.

17. The engine as recited in claim 16, comprising:
a first line extending from the oil pump;
a second line extending from the first line and for supplying oil to the fan drive gear system from the oil tank; and
a third line extending from the first line and for supplying oil to a turbofan engine component from the oil tank.

18. The engine as recited in claim 17, wherein the first line is disposed at a pressure side of the oil pump.

19. The engine as recited in claim 18, comprising:
a bearing compartment housing the fan drive gear system; and
a scavenge pump configured to pump scavenge oil from the bearing compartment to the oil tank.

20. The engine as recited in claim 1, wherein the first tower shaft and the second tower shaft are disposed about different axes.

* * * * *